United States Patent
Bird et al.

(10) Patent No.: US 9,473,531 B2
(45) Date of Patent: *Oct. 18, 2016

(54) ENDPOINT TRAFFIC PROFILING FOR EARLY DETECTION OF MALWARE SPREAD

(71) Applicant: International Business Machines Corporation, Armonk, NY (US)

(72) Inventors: William A. Bird, Fredericton (CA); Rory F. Bray, Rothesay (CA); Jody D. Brownell, Charters Settlement (CA); Ben A. Wuest, Fredericton (CA)

(73) Assignee: International Business Machines Corporation, Armonk, NY (US)

( * ) Notice: Subject to any disclaimer, the term of this patent is extended or adjusted under 35 U.S.C. 154(b) by 40 days.

This patent is subject to a terminal disclaimer.

(21) Appl. No.: 14/542,693

(22) Filed: Nov. 17, 2014

(65) Prior Publication Data

US 2016/0142426 A1    May 19, 2016

(51) Int. Cl.
*H04L 29/06* (2006.01)
*G06F 9/54* (2006.01)
*G06F 21/56* (2013.01)

(52) U.S. Cl.
CPC ........... *H04L 63/1483* (2013.01); *G06F 9/542* (2013.01); *G06F 21/56* (2013.01);
(Continued)

(58) Field of Classification Search
CPC ............. H04L 63/148; H04L 63/1441; H04L 61/1511; H04L 63/1408; G06F 2221/2119; G06F 17/30864
See application file for complete search history.

(56) References Cited

U.S. PATENT DOCUMENTS

| | | | |
|---|---|---|---|
| 7,685,631 B1 * | 3/2010 | Paya | H04L 9/3271 726/27 |
| 7,712,134 B1 | 5/2010 | Nucci et al. | |

(Continued)

FOREIGN PATENT DOCUMENTS

| | | |
|---|---|---|
| JP | 5083760 B2 | 11/2012 |
| KR | 1020070095718 A | 10/2007 |
| WO | 2011149773 A2 | 12/2011 |

OTHER PUBLICATIONS

Alkhozae, M. G., & Batarfi, O. A. (2011). Phishing websites detection based on phishing characteristics in the webpage source code. International Journal of Information and Communication Technology Research, 1(6).*

(Continued)

*Primary Examiner* — James Turchen
(74) *Attorney, Agent, or Firm* — Robert C. Bunker

(57) ABSTRACT

According to one exemplary embodiment, a method for detecting malware in a network stream to at least one host computer is provided. The method may include initializing a browser profile corresponding with a first website having a first website source and a first plurality of content features. The method may include recording the first plurality of content features and a trusted source based on the first website source. The method may include scanning the network stream for a second content feature within a second plurality of content features associated with a second website. The method may include determining if the second content feature matches a first content feature. The method may include determining if the second plurality of content features is consistent with the first plurality of content features. The method may include determining if a second website source matches the trusted source. The method may include generating an alert.

12 Claims, 4 Drawing Sheets

(52) U.S. Cl.
  CPC ........ *H04L 63/145* (2013.01); *H04L 63/1416* (2013.01); *H04L 63/1441* (2013.01); *G06F 2221/2119* (2013.01); *H04L 63/0281* (2013.01)

(56) References Cited

U.S. PATENT DOCUMENTS

| | | | |
|---|---|---|---|
| 8,028,337 | B1 | 9/2011 | Xu et al. |
| 8,418,249 | B1 | 4/2013 | Nucci et al. |
| 8,533,819 | B2 | 9/2013 | Hoeflin et al. |
| 8,903,941 | B1* | 12/2014 | Kaul ............... G06F 21/54 709/203 |
| 8,943,588 | B1* | 1/2015 | Speegle ........... H04L 63/1483 726/22 |
| 9,069,885 | B1* | 6/2015 | Moeller ........... G06F 11/1448 |
| 2005/0015626 | A1* | 1/2005 | Chasin ............ H04L 63/0245 726/4 |
| 2005/0076222 | A1* | 4/2005 | Olkin ............. H04L 63/0442 713/176 |
| 2006/0123478 | A1* | 6/2006 | Rehfuss .......... H04L 63/1408 726/22 |
| 2006/0251068 | A1* | 11/2006 | Judge ............. H04L 12/585 370/389 |
| 2007/0083670 | A1* | 4/2007 | Kelley ........... H04L 29/12066 709/245 |
| 2007/0118528 | A1* | 5/2007 | Choi ............... H04L 12/585 |
| 2008/0046738 | A1* | 2/2008 | Galloway ........ H04L 63/1416 713/176 |
| 2008/0172738 | A1* | 7/2008 | Bates ............. G06F 17/30887 726/22 |
| 2008/0172741 | A1* | 7/2008 | Reumann ........ H04L 63/1483 726/23 |
| 2009/0077383 | A1* | 3/2009 | de Monseignat ... H04L 63/0823 713/175 |
| 2009/0089859 | A1* | 4/2009 | Cook ............... H04L 12/585 726/3 |
| 2010/0186088 | A1* | 7/2010 | Banerjee ......... G06F 21/51 726/23 |
| 2012/0158626 | A1* | 6/2012 | Zhu ................. H04L 63/1408 706/13 |
| 2013/0317904 | A1* | 11/2013 | Tan ................. G06Q 30/0248 705/14.47 |
| 2015/0128272 | A1* | 5/2015 | Chen ............... H04L 63/1483 726/23 |
| 2016/0142426 | A1* | 5/2016 | Bird ................ H04L 63/145 726/23 |

OTHER PUBLICATIONS

IBM, "List of IBM Patents or Patent Applications Treated as Related (Appendix P)," Jun. 3, 2015, p. 1-2.

Bird et al., "Endpoint Traffic Profiling for Early Detection of Malware Spread," filed Jun. 3, 2015, p. 1-23, U.S. Appl. No. 14/729,691.

Faloutsos, "Detecting Malware with Graph-based Methods: Traffic Classification, Botnets, and Facebook Scams", WWW 2013 Companion, May 13-17, 2013, Rio de Janeiro, Brazil, pp. 495-496.

Trusteer, An IBM Company, http://www.trusteer.com, Accessed on Jun. 2, 2014, 1 page.

* cited by examiner

ENDPOINT TRAFFIC PROFILING FOR EARLY DETECTION OF MALWARE SPREAD

BACKGROUND

The present invention relates generally to the field of computing, and more particularly to malware detection.

Computer system security may be an important consideration for all computer users, from businesses to private individuals. Malware infections have become a common occurrence for computer systems that may result in compromised computer security. Various forms of malware may be used to collect sensitive information, gain access to a computer system, or disrupt computer operation. Some malware utilizes deception to fool users into believing a website the user may be accessing may be legitimate while the website may not be legitimate. Having deceived the user, the malware may capture sensitive information from the user. Traditional malware countermeasures often rely on scanning for the presence of malware based on comparing known malware signatures to data files stored on a computer.

SUMMARY

According to one exemplary embodiment, a method for detecting malware in a network stream to at least one host computer is provided. The method may include initializing a browser profile corresponding with a first website having a first website source and a first plurality of content features. The method may also include recording in the browser profile the first plurality of content features and a trusted source based on the first website source. The method may then include scanning the network stream to the at least one host computer for a second content feature within a second plurality of content features associated with a second website. The method may further include determining if the second content feature matches a first content feature within the first plurality of content features recorded in the browser profile based on finding the second content feature while scanning the network stream. The method may also include determining if the second plurality of content features is consistent with the first plurality of content features based on determining the second content feature matches the first content feature. The method may then include determining if a second website source associated with the second website matches the trusted source based on determining that the second plurality of content features is consistent with the first plurality of content features. The method may further include generating an alert based on determining that the second plurality of features is inconsistent with the first plurality of content features or the second website source does not match the trusted source.

According to another exemplary embodiment, a computer system for detecting malware in a network stream to at least one host computer is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include initializing a browser profile corresponding with a first website having a first website source and a first plurality of content features. The method may also include recording in the browser profile the first plurality of content features and a trusted source based on the first website source. The method may then include scanning the network stream to the at least one host computer for a second content feature within a second plurality of content features associated with a second website. The method may further include determining if the second content feature matches a first content feature within the first plurality of content features recorded in the browser profile based on finding the second content feature while scanning the network stream. The method may also include determining if the second plurality of content features is consistent with the first plurality of content features based on determining the second content feature matches the first content feature. The method may then include determining if a second website source associated with the second website matches the trusted source based on determining that the second plurality of content features is consistent with the first plurality of content features. The method may further include generating an alert based on determining that the second plurality of features is inconsistent with the first plurality of content features or the second website source does not match the trusted source.

According to yet another exemplary embodiment, a computer program product for detecting malware in a network stream to at least one host computer is provided. The computer program product may include one or more computer-readable storage devices and program instructions stored on at least one of the one or more tangible storage devices, the program instructions executable by a processor. The computer program product may include program instructions to initialize a browser profile corresponding with a first website having a first website source and a first plurality of content features. The computer program product may also include program instructions to record in the browser profile the first plurality of content features and a trusted source based on the first website source. The computer program product may then include program instructions to scan the network stream to the at least one host computer for a second content feature within a second plurality of content features associated with a second website. The computer program product may further include program instructions to determine if the second content feature matches a first content feature within the first plurality of content features recorded in the browser profile based on finding the second content feature while scanning the network stream. The computer program product may also include program instructions to determine if the second plurality of content features is consistent with the first plurality of content features based on determining the second content feature matches the first content feature. The computer program product may then include program instructions to determine if a second website source associated with the second website matches the trusted source based on determining that the second plurality of content features is consistent with the first plurality of content features. The computer program product may further include program instructions to generate an alert based on determining that the second plurality of features is inconsistent with the first plurality of content features or the second website source does not match the trusted source.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
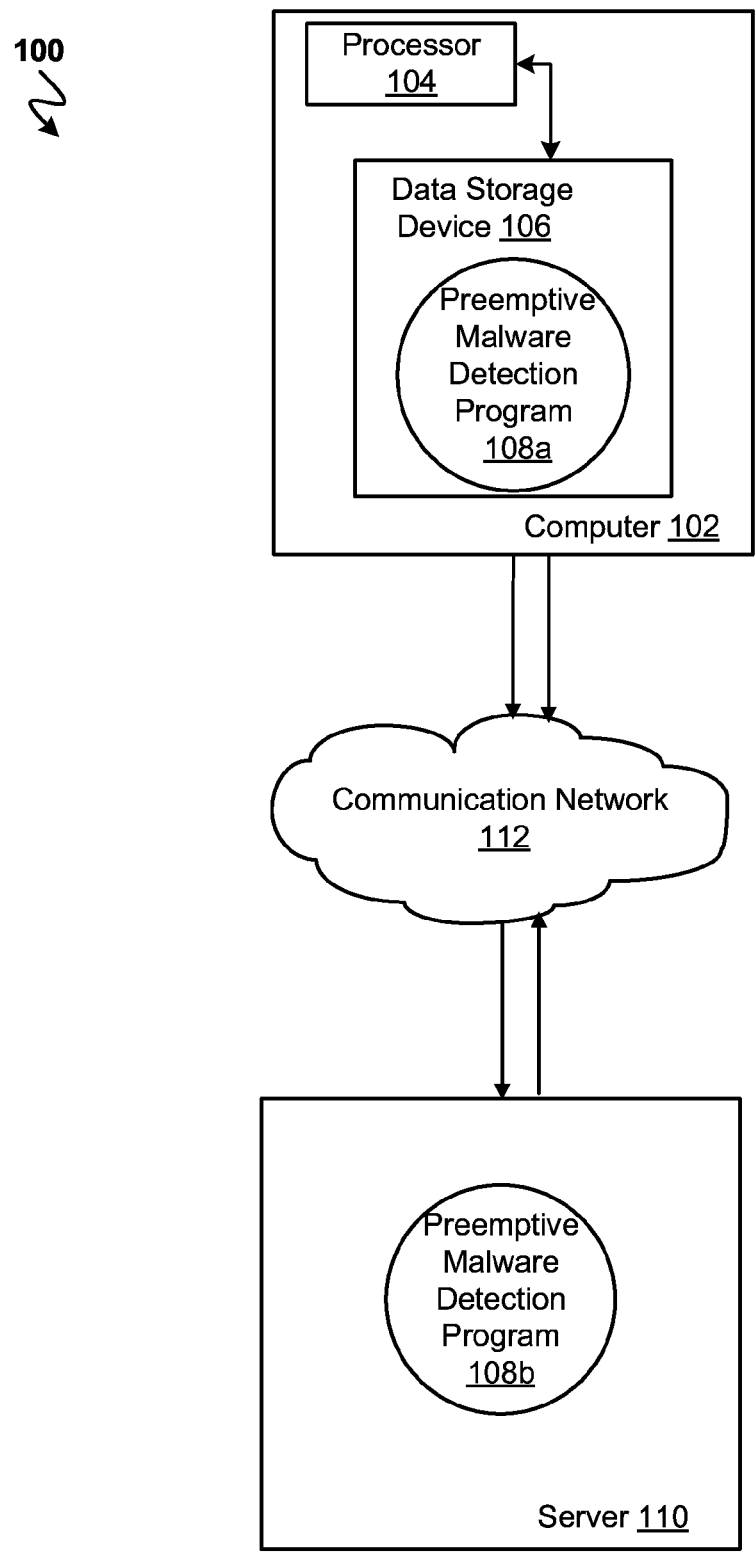
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for endpoint traffic profiling for early detection of malware spread. Additionally, the present embodiments have the capacity to improve the technical field of malware detection by using network traffic malware detection at endpoint computers.

As described previously, malware may be used to compromise computer security systems. Traditional malware countermeasures rely on heuristics or scanning for known malware data signatures among the data files stored on a host computer system (e.g., a personal computer, smartphone, server, etc.). The traditional detection and response model for dealing with malware may be deficient since the model relies on detecting the malware after the malware may already have a presence in the host computer system. In instances where multiple host computer systems may be connected together in a network, malware may spread to many, or all, of the host computer systems in the network before detection and a proper response may be administered.

Malware may take many forms, such as viruses or trojans. Malware may also employ deception to fool a user into thinking the user is going to a known website (e.g., a banking website) while in fact the user is transparently redirected to a counterfeit website to obtain sensitive information (e.g., login and password). Additionally, users may fall prey to a phishing email by clicking a link in an email that directs the user to a counterfeit website where sensitive user information may be obtained. Traditional malware detection may not alert or prevent users from being deceived in such ways.

Therefore, it may be advantageous to, among other things, provide a way to preemptively detect counterfeit websites in network traffic and alert the user or security management before sensitive information may be compromised.

According to at least one embodiment, a browsing profile may be initialized at the request of a user (e.g., through a web browser plugin) to store in a data storage device (e.g., hard disk drive) the original source (e.g., internet protocol (IP) address) of content of interest (e.g., website images, links, metadata, document structure, etc.) associated with a website that the user may frequent. Each browsing profile may be initialized with multiple fields such as profile name, trusted domain list, trusted IP list, and an update interval. Browsing profiles may then be stored in a data repository, such as a profile database. After initializing a browsing profile, the website indicated by the user request may have the content of interest identified and analyzed to determine the original source of the content. The identified content of interest and original content source may then be recorded in the browser profile associated with the indicated website in the profile database for later retrieval. As such, the user at the endpoint may decide what may be trusted site content by requesting a browser profile of a website that the user may deem trustworthy at the time the user makes the request.

Deceptive malware may be detected at the network layer by using network traffic stream monitoring to check a network traffic stream passing within a network link to a host computer system for data associated with websites listed in the profile database. If website data corresponding to a website listed in the profile database may be found in the network traffic stream, the IP source of the found website data may be compared with the trusted IP list recorded in the profile database. If the IP source of the found website data may not match the trusted IP list for the website recorded in the profile database, an alert may be generated or some other response may be taken.

Additionally, deceptive malware may also be detected at the application layer (e.g., web browser). When a user's application, such as a web browser, attempts to load data from a website that may be listed in the profile database, incoming content of interest (e.g., website images, links, metadata, document structure, etc.) may be compared with content of interest attributes recorded in the profile database. If the incoming content of interest attributes do not match the recorded content of interest attributes, an alert may be generated or some other response may be taken.

According to at least one implementation, browser profile management, network traffic stream monitoring and alert generation may all be handled at an individual host computer system as a standalone mode. According to at least one other implementation, multiple host computer systems operating in standalone mode may report detected traffic pattern inconsistencies to connected security information and event manager (SIEM) software over transmission control protocol (TCP) or user datagram protocol (UDP) as an enterprise mode.

According to yet another implementation, a proxy may be used to store global browser profiles for a set of multiple networked host computer systems (i.e., an enterprise). Any host computer system in the enterprise may report traffic inconsistencies to the proxy. The proxy may then relay the traffic inconsistencies to the SIEM and share suspicious traffic signatures found at the network layer or application layer with the rest of the host computer systems in the enterprise as an enterprise mode with proxy. As such, each host computer system in the enterprise may benefit and be protected by the collective knowledge of all the host computer systems in the enterprise.

Referring now to FIG. 1, an exemplary networked computer environment 100 in accordance with one embodiment is depicted. The networked computer environment 100 may include a computer 102 with a processor 104 and a data storage device 106 that is enabled to run a preemptive malware detection program 108a. The networked computer environment 100 may also include a server 110 that is enabled to run a preemptive malware detection program 108b and a communication network 112. The networked computer environment 100 may include a plurality of computers 102 and servers 110, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 110 via the communications network 112. The communications network 112 may include connections, such as wire, wireless communication links, or fiber optic cables. As will be discussed with reference to FIG. 4, server computer 110 may include internal components 800a and external components 900a, respectively and client computer 102 may include internal components 800b and external components 900b, respectively. Client computer 102 may be, for example, a mobile device, a telephone, a PDA, a netbook, a laptop computer, a tablet computer, a desktop computer, or any type of computing device capable of running a program and accessing a network.

A program, such as a preemptive malware detection program 108a and 108b may run on the client computer 102 or on the server computer 110. The preemptive malware detection program 108a and 108b may be used to detect malware through scanning network traffic stream for inconsistencies against known valid data. The preemptive malware detection program 108a and 108b is explained in further detail below with respect to FIGS. 2 and 3.

Figure 2:
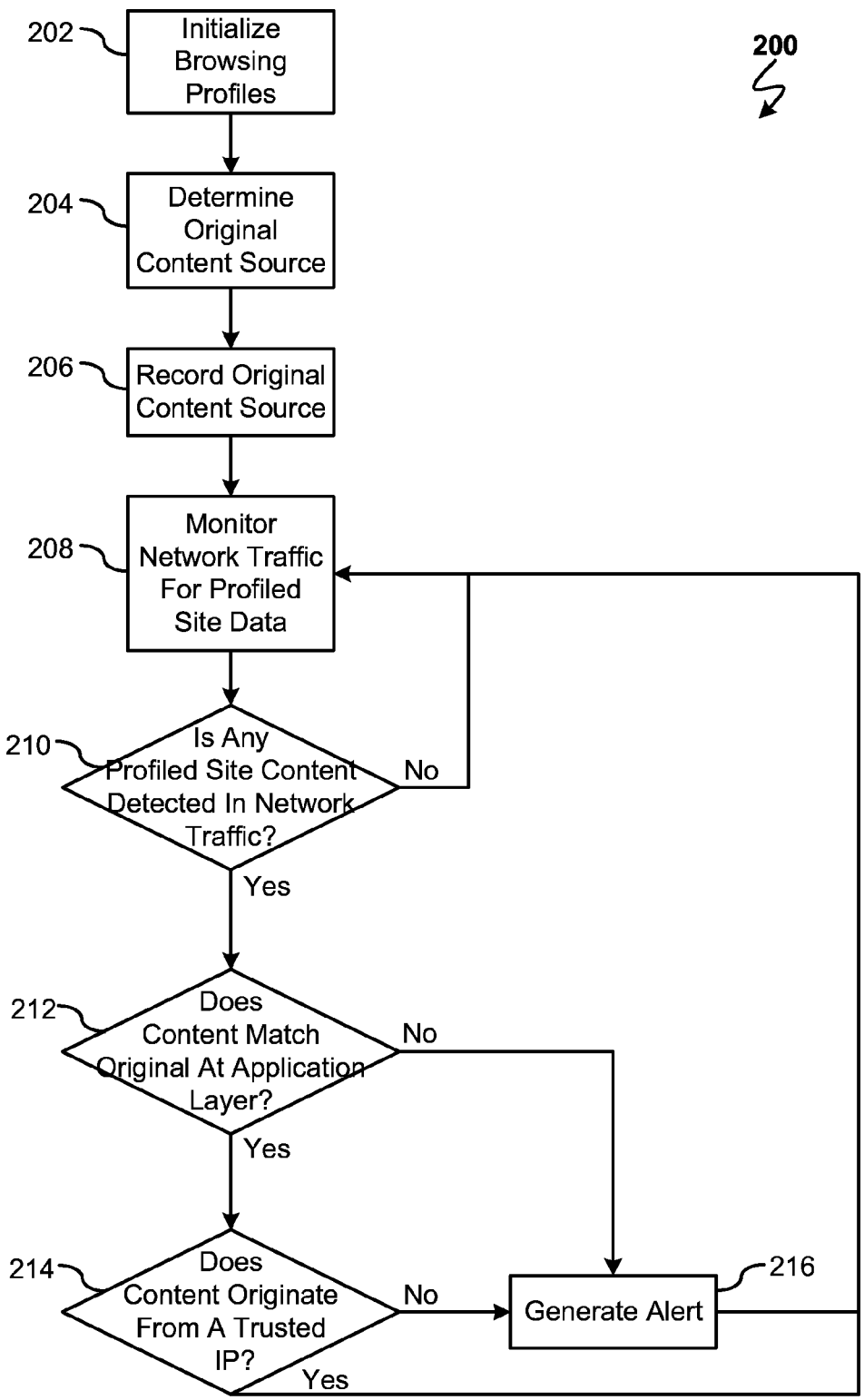
FIG. 2 is an operational flow chart illustrating a process for endpoint profiling and malware detection according to at least one embodiment.

Referring now to FIG. 2, an operational flow chart illustrating the exemplary process 200 by the preemptive malware detection program 108a and 108b (FIG. 1) according to at least one embodiment is depicted.

At 202, the process 200 may initialize a browsing profile in response to a request by a user. According to at least one embodiment, the preemptive malware detection program 108a and 108b (FIG. 1) may utilize a web browser plugin to provide a user interface associated with a web browser to generate requests to profile websites. For example, a web browser plugin may display a button on the user's web browser that the user may click to indicate that the user wants the web page that the web browser may be displaying currently to be profiled by the process 200. The plugin may then generate a profile request by sending data associated with the currently displayed web page, such as the uniform resource locator (URL) associated with the web page, to the process 200. It may be appreciated that other ways of generating requests to profile websites may be used, such as a standalone program that accepts manually entered URLs, an automated algorithm that identifies frequently visited websites to profile, etc.

Once the process 200 receives the generated profile request, the process may initialize a browsing profile based on the request. According to at least one embodiment, a data structure, such as an array, may be initialized with multiple elements to store data as the basis for the browsing profile. For example, the array may have an element corresponding to the website URL. The array may have another element corresponding to the name of the website that may be indicated by the user and sent in the profile request, or the name may be automatically filled based on the website title. The array may also have elements for a trusted domain list, trusted IP list, and an update interval. Additionally, array elements for application layer content comparisons may also be initialized, such as elements to store document structure, document item source (e.g., where website images are delivered from), contained links and contained metadata. According to at least one implementation, the update interval may be set by the process 200 as a constant value used for each browser profile. The process 200 may contact each trusted domain to learn the content supplied by each domain according to the update interval timing (e.g., once a week).

Next, at 204, the process 200 may determine the original content source for the content of the website being profiled. According to at least one embodiment, the process 200 may determine the domain from which the website originates at the time the profile request may have been received. The trusted domain list in the browser profile may be populated by the process 200 based on the determined website domain. The trusted IP list in the browser profile may include one or more trusted IP addresses derived from the trusted domain list. Additionally, the process 200 may create a snapshot of the website structure, source of site items (e.g., images), the destinations of links contained in the website, and metadata contained in the website.

Then, at 206, the data captured by the process 200 may be recorded in the previously initialized data structure. According to at least one embodiment, the snapshot of the website, the sources for the website, and the website contents may be used to populate elements of the data structure created previously as the browsing profile associated with the website. Multiple browsing profile data structures may be stored in a data repository, such as a database, for later retrieval by the process 200.

At 208, network traffic to a user host computer system may be monitored for website data corresponding to websites stored in browser profiles. According to one embodiment, the process 200 may monitor all network traffic incoming to the host computer system. The process 200 may search for data in the network traffic stream that matches data stored in the browser profiles.

Next, at 210, the process 200 may determine if any data in network traffic to the host computer system matches data in the browser profile at the network layer. If the process 200 determines that there may be data matching a website profiled in a browser profile, the process may then determine if the content of the data found in the network traffic stream matches the content recorded in the browser profiles at 212. If the process 200 determines that there may not be any data from profiled websites currently in network traffic, the process may return to 208 to continue monitoring network traffic.

If the process 200 determines that the data detected in the network traffic stream matches data identified in the browser profile at 210, the process 200 may then, at 212, determine if content of interest contained in the website data found in network traffic matches the original website content of interest data that may be recorded in the browser profile by comparison. For example, the process 200 may find an image file (e.g., a bank logo stored as a graphics interchange format (GIF) file) in the incoming network traffic stream to a host computer system. The process 200 may determine that the image file may have been recorded in a browser profile stored in a profile database. The source IP address of the image file intercepted in network traffic may then be compared with the original source IP address for the image file recorded in a browser profile to determine if the IP addresses match. According to at least one other implementation, the process 200 at 212 may also determine if there may be any content in the website that does not match the browser profile (e.g., additional links or images) that may come from trusted domains and untrusted IP addresses.

If the process 200 determines that content of interest found in network traffic matches content of interest in a browser profile at 212, the process 200 may then, at 214, determine if the content of interest found in network traffic corresponding to content of interest identified in the browser profile originated from a trusted IP address. According to at least one embodiment, once content of interest in the network traffic stream may have been detected that matches content of interest stored in a browser profile at 212, the process 200 may compare the IP source of the content of interest detected in the network traffic stream with the trusted IP list stored in the browser profile associated with the matching content of interest.

However, if the process 200 determines that website content data may not match the website content data recorded in the browser profile at 212, or if the process 200 determines that the data detected in the network traffic stream corresponding to data identified in the browser profile may not have originated from a trusted IP at 214, an alert may be generated at 216. According to at least one implementation, an alert may be generated to report network traffic inconsistencies through a warning message to a host desktop computer system. According to at least one other implementation, an alert may be generated and sent as an email to the preconfigured email address of the host computer system user. According to yet another implementation, network traffic inconsistencies may be sent over a network connection to a SIEM solution. According to at least one other implementation, a user's web browser may be redirected from the counterfeit website the user may be trying to access to a web page that contains an alert. The web page alert that the user may be redirected to may also display pertinent information explaining to the user that the user was redirected because of anomalies in the website data that may implicate malware. It may be appreciated that other ways of alerting or otherwise reacting to inconsistent network traffic may be utilized.

Figure 3:
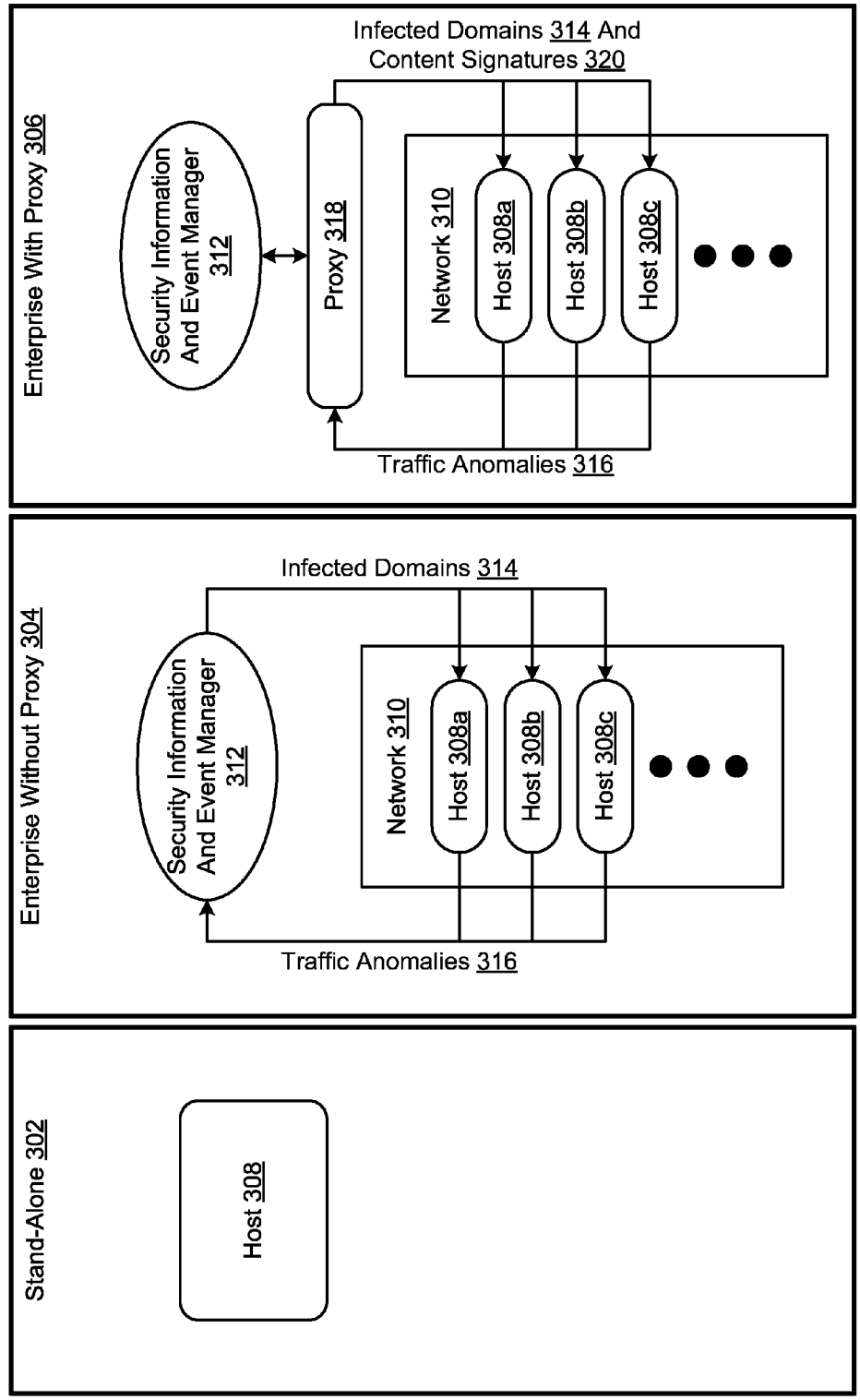
FIG. 3 is a block diagram illustrating three alternative implementations of the endpoint profiling and malware detection process.

Referring now to FIG. 3, a set of alternative implementations 300 of the preemptive malware detection program 108a and 108b (FIG. 1) are depicted. The set of alternative implementations 300 may include, but are not limited to, a stand-alone mode 302, an enterprise mode without proxy 304, and an enterprise mode with proxy 306.

The stand-alone mode 302 implementation may include a single host 308 computer system that runs process 200 (FIG. 2). In stand-alone mode 302, browser profile management, network traffic stream monitoring, and alert generation may all be handled by the single host 308 computer system.

The enterprise mode without proxy 304 may include a set of hosts 308a-c in a network 310 linked to a security information and event manager (SIEM) 312. In the enterprise mode without proxy 304, the set of hosts 308a-c may receive data from infected domains 314 and then report traffic anomalies 316 discovered by the process 200 (FIG. 2) running on each host (e.g., 308a) to the SIEM 312 over a network link (e.g., TCP/UDP). The SIEM 312 may then decide if the entire enterprise (i.e., all hosts 308a-c) may need to be alerted based on the amount of network traffic inconsistencies.

The enterprise mode with proxy 306 may include a set of hosts 308a-c in a network 310 linked to a proxy 318 that communicates with the SIEM 312. In the enterprise mode with proxy 306, the proxy 318 may store browser profiles for all hosts 308a-c in the network 310. The proxy 318 may share suspicious content signatures 320 found in traffic anomalies 316 at the application and network layers (e.g., 212 and 214 (FIG. 2)) with all hosts 308a-c. As individual hosts (e.g., 308a) share suspicious content signatures 320 with the proxy 318, the proxy 318 may build a knowledge base of suspicious content signatures 320 from all of the hosts 308a-c. The proxy 318 may then share the suspicious content signatures 320 with all hosts 308a-c, such that all hosts 308a-c may benefit from the collective knowledge of the proxy 318 to preemptively avoid malware.

It may be appreciated that FIGS. 2 and 3 provide only an illustration of a few implementations and do not imply any limitations with regard to how different embodiments may be implemented. Many modifications to the depicted embodiments may be made based on design and implementation requirements.

Figure 4:
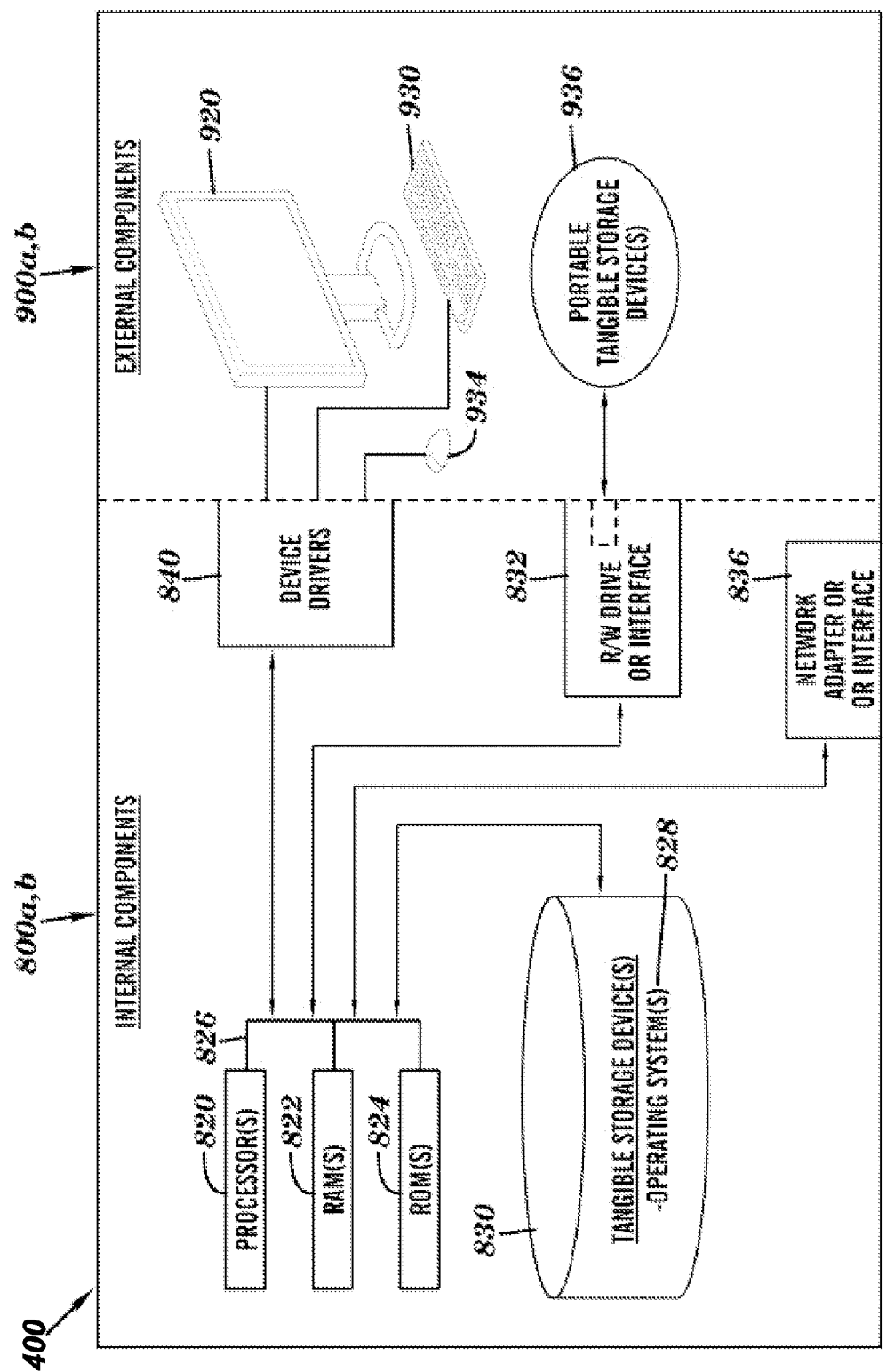
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 110 (FIG. 1) may include respective sets of internal components 800 a, b and external components 900 a, b illustrated in FIG. 4. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as a preemptive malware detection program 108a and 108b (FIG. 1), may be stored on one or more computer-readable tangible storage devices 830 for execution by one or more processors 820 via one or more RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b also includes a R/W drive or interface 832 to read from and write to one or more portable computer-readable tangible storage devices 936 such as a CD-ROM, DVD, memory stick, magnetic tape, magnetic disk, optical disk or semiconductor storage device. The preemptive malware detection program 108a and 108b (FIG. 1) can be stored on one or more of the respective portable computer-readable tangible storage devices 936, read via the respective R/W drive or interface 832 and loaded into the respective hard drive 830.

Each set of internal components 800 *a, b* may also include network adapters (or switch port cards) or interfaces 836 such as a TCP/IP adapter cards, wireless wi-fi interface cards, or 3G or 4G wireless interface cards or other wired or wireless communication links. The preemptive malware detection program 108*a* (FIG. 1) in client computer 102 (FIG. 1) and the preemptive malware detection program 108*b* (FIG. 1) in network server computer 110 (FIG. 1) can be downloaded from an external computer (e.g., server) via a network (for example, the Internet, a local area network or other, wide area network) and respective network adapters or interfaces 836. From the network adapters (or switch port adaptors) or interfaces 836, the preemptive malware detection program 108*a* (FIG. 1) in client computer 102 (FIG. 1) and the preemptive malware detection program 108*b* (FIG. 1) in network server computer 110 (FIG. 1) are loaded into the respective hard drive 830. The network may comprise copper wires, optical fibers, wireless transmission, routers, firewalls, switches, gateway computers and/or edge servers.

Each of the sets of external components 900 *a, b* can include a computer display monitor 920, a keyboard 930, and a computer mouse 934. External components 900 *a, b* can also include touch screens, virtual keyboards, touch pads, pointing devices, and other human interface devices. Each of the sets of internal components 800 *a, b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for detecting malware in a network stream to at least one host computer, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system executes the program instructions to perform the steps comprising:
initializing a browser profile corresponding with a first website having a first website source and a first plurality of content features;
determining the first plurality of content features based on the first website, wherein a first content feature within the first plurality of content features has a first content feature internet protocol (IP) address indicating a first content feature source;
recording in the browser profile the first plurality of content features, the first content feature IP address, and a trusted source based on the first website source;
scanning the network stream to the at least one host computer for a second content feature within a second plurality of content features associated with a second website;
determining if the second content feature matches the first content feature within the first plurality of content features recorded in the browser profile based on finding the second content feature while scanning the network stream, wherein the second content feature has a second content feature IP address indicating a second content feature source;
determining if the second plurality of content features is consistent with the first plurality of content features based on determining the second content feature matches the first content feature, wherein determining if the second plurality of content features is consistent with the first plurality of content features comprises comparing the first content feature IP address recorded in the browser profile to the second content feature IP address;
determining if a second website source associated with the second website matches the trusted source based on determining that the second plurality of content features is consistent with the first plurality of content features;
generating an alert based on determining that the second plurality of features is inconsistent with the first plurality of content features or the second website source does not match the trusted source;
generating, by the at least one host computer, a content signature based on the second plurality of features;
sending the generated content signature to a proxy, wherein the proxy is connected to a plurality of enterprise hosts and the at least on host computer by a network within an enterprise; and
forwarding the stored content signature from the proxy to the plurality of enterprise hosts within the enterprise, wherein the plurality of enterprise hosts individually store the sent content signature.

2. The computer system of claim 1, wherein the first plurality of content features and the second plurality of content features comprises at least one of a plurality of website metadata, a plurality of website image sources, a plurality of website links, or a website structure.

3. The computer system of claim 1, wherein the first website source comprises a trusted domain, the second website source comprises a domain, and the trusted source comprises a list of trusted internet protocol (IP) addresses.

4. The computer system of claim 1, wherein the generated alert may comprise at least one of outputting the generated alert as a warning message to the host computer, sending the generated alert as an email to a preconfigured email address, or sending the generated alert over a network link to a security information and event manager (SIEM).

5. The computer system of claim 1, wherein the browser profile is stored as a data structure in a data storage device accessible by the at least one host computer.

6. The computer system of claim 4, wherein the at least one host computer comprises the at least one host computer within a plurality of host computers linked together in a network with the SIEM.

7. The computer system of claim 6, wherein the browser profile is stored in a proxy linked to the plurality of host computers and to the SIEM.

8. The computer system of claim 7, wherein the generated alert may comprise sending the generated alert from the proxy to each host computer within the plurality of host computers.

9. A computer program product for detecting malware in a network stream to at least one host computer, comprising:
one or more computer-readable storage devices and program instructions stored on at least one of the one or more tangible storage devices, the program instructions executable by a processor, the program instructions comprising:
program instructions to initialize a browser profile corresponding with a first website having a first website source and a first plurality of content features;
program instructions to determine the first plurality of content features based on the first website, wherein a first content feature within the first plurality of content features has a first content feature internet protocol (IP) address indicating a first content feature source;
program instructions to record in the browser profile the first plurality of content features, the first content feature IP address, and a trusted source based on the first website source;
program instructions to scan the network stream to the at least one host computer for a second content feature within a second plurality of content features associated with a second website;
program instructions to determine if the second content feature matches the first content feature within the first plurality of content features recorded in the browser profile based on finding the second content feature while scanning the network stream, wherein the second content feature has a second content feature IP address indicating a second content feature source;
program instructions to determine if the second plurality of content features is consistent with the first plurality of content features based on determining the second content feature matches the first content feature, wherein determining if the second plurality of content features is consistent with the first plurality of content features comprises comparing the first content feature IP address recorded in the browser profile to the second content feature IP address;
program instructions to determine if a second web site source associated with the second website matches the trusted source based on determining that the second plurality of content features is consistent with the first plurality of content features;
program instructions to generate an alert based on determining that the second plurality of features is inconsistent with the first plurality of content features or the second website source does not match the trusted source;
program instructions to generate, by the at least one host computer, a content signature based on the second plurality of features;
program instructions to send the generated content signature to a proxy, wherein the proxy is connected to a plurality of enterprise hosts and the at least on host computer by a network within an enterprise; and
program instructions to forward the stored content signature from the proxy to the plurality of enterprise hosts within the enterprise, wherein the plurality of enterprise hosts individually store the sent content signature.

10. The computer program product of claim 9, wherein the first plurality of content features and the second plurality of content features comprises at least one of a plurality of website metadata, a plurality of website image sources, a plurality of website links, or a website structure.

11. The computer program product of claim 9, wherein the first website source comprises a trusted domain, the second website source comprises a domain, and the trusted source comprises a list of trusted internet protocol (IP) addresses.

12. The computer program product of claim 9, wherein the generated alert may comprise at least one of outputting the generated alert as a warning message to the host computer, sending the generated alert as an email to a preconfigured email address, or sending the generated alert over a network link to a security information and event manager (SIEM).

* * * * *